(12) United States Patent
Wilmot et al.

(10) Patent No.: US 10,788,059 B2
(45) Date of Patent: Sep. 29, 2020

(54) MULTI-PURPOSE AND TUNABLE PRESSURE CHAMBER FOR PYROTECHNIC ACTUATOR

(71) Applicant: Joyson Safety Systems Acquisition LLC, Auburn Hills, MI (US)

(72) Inventors: Larry M. Wilmot, Oxford, MI (US); Rachid Hammoud, Windsor (CA); Joshua D. Van Hooser, Waterford, MI (US); Dennis K. Scheer, Birmingham, MI (US)

(73) Assignee: Joyson Safety Systems Acquisition LLC, Auburn Hills, MI (US)

( * ) Notice: Subject to any disclaimer, the term of this patent is extended or adjusted under 35 U.S.C. 154(b) by 0 days.

(21) Appl. No.: 16/383,254

(22) Filed: Apr. 12, 2019

(65) Prior Publication Data

US 2019/0234434 A1 Aug. 1, 2019

Related U.S. Application Data

(62) Division of application No. 14/708,176, filed on May 8, 2015, now Pat. No. 10,260,535.

(60) Provisional application No. 61/990,157, filed on May 8, 2014.

(51) Int. Cl.
*F15B 15/19* (2006.01)
*F15B 15/14* (2006.01)
*B23P 15/00* (2006.01)

(52) U.S. Cl.
CPC .............. *F15B 15/19* (2013.01); *B23P 15/00* (2013.01); *F15B 15/1428* (2013.01); *F15B 15/1447* (2013.01); *F15B 15/1457* (2013.01); *Y10T 29/49401* (2015.01)

(58) Field of Classification Search
CPC .............. F15B 15/1428; F15B 15/1447; F15B 14/1457; F15B 2211/218; F15B 15/19
USPC ................................................................ 91/5
See application file for complete search history.

(56) References Cited

U.S. PATENT DOCUMENTS

| 6,234,062 | B1 | 5/2001 | Griffin |
| 7,762,584 | B2 | 7/2010 | Morita et al. |
| 7,857,087 | B2 | 12/2010 | Matsuura et al. |
| 8,141,671 | B2 | 3/2012 | Aoki et al. |
| 2006/0118348 | A1 | 6/2006 | Haglund |
| 2009/0084620 | A1 | 4/2009 | Matsuura et al. |
| 2013/0019743 | A1 | 1/2013 | Dreyer et al. |

(Continued)

FOREIGN PATENT DOCUMENTS

| CN | 102501026 A | 6/2012 |
| CN | 102561589 A | 7/2012 |
| CN | 102954721 | 3/2013 |

(Continued)

OTHER PUBLICATIONS

Chinese Office Action, dated Oct. 15, 2018, in connection with Chinese Application No. 201580024964.2.

(Continued)

*Primary Examiner* — Michael Leslie
*Assistant Examiner* — Daniel S Collins
(74) *Attorney, Agent, or Firm* — Meunier Carlin & Curfman LLC

(57) ABSTRACT

A pressurized gas-powered actuator includes a housing and a piston movably positioned within the housing. The piston has a drive pocket formed therein. A gas generator is positioned exterior of the piston and in fluid communication with the drive pocket.

17 Claims, 9 Drawing Sheets

(56) References Cited

U.S. PATENT DOCUMENTS

2015/0075402 A1    3/2015  Henck

FOREIGN PATENT DOCUMENTS

| | | |
|---|---|---|
| DE | 19542513 | 11/1997 |
| DE | 102005001115 | 3/2009 |
| EP | 1565356 A1 | 8/2005 |
| GB | 2432399 | 5/2007 |
| GB | 2432399 A | 5/2007 |
| JP | H11247716 A | 9/1999 |
| JP | 2003247509 A | 9/2003 |

OTHER PUBLICATIONS

Chinese Office Action, dated Jul. 3, 2018, in connection with Chinese Application No. 201580024964.2.
Chinese Office Action, dated Mar. 7, 2018, in connection with Chinese Application No. 201580024964.2.
Office Action issued in related Chinese Application No. 201580024964.2, dated Sep. 15, 2017.
International Preliminary Report on Patentability issued in International Application No. PCT/US2015/030042, dated Nov. 17, 2016.
International Search Report and Written Opinion issued in International application No. PCT/US2015/030042, dated Sep. 30, 2015.
Japanese Office Action, dated Apr. 9, 2019, in connection of Application No. 2017511566.

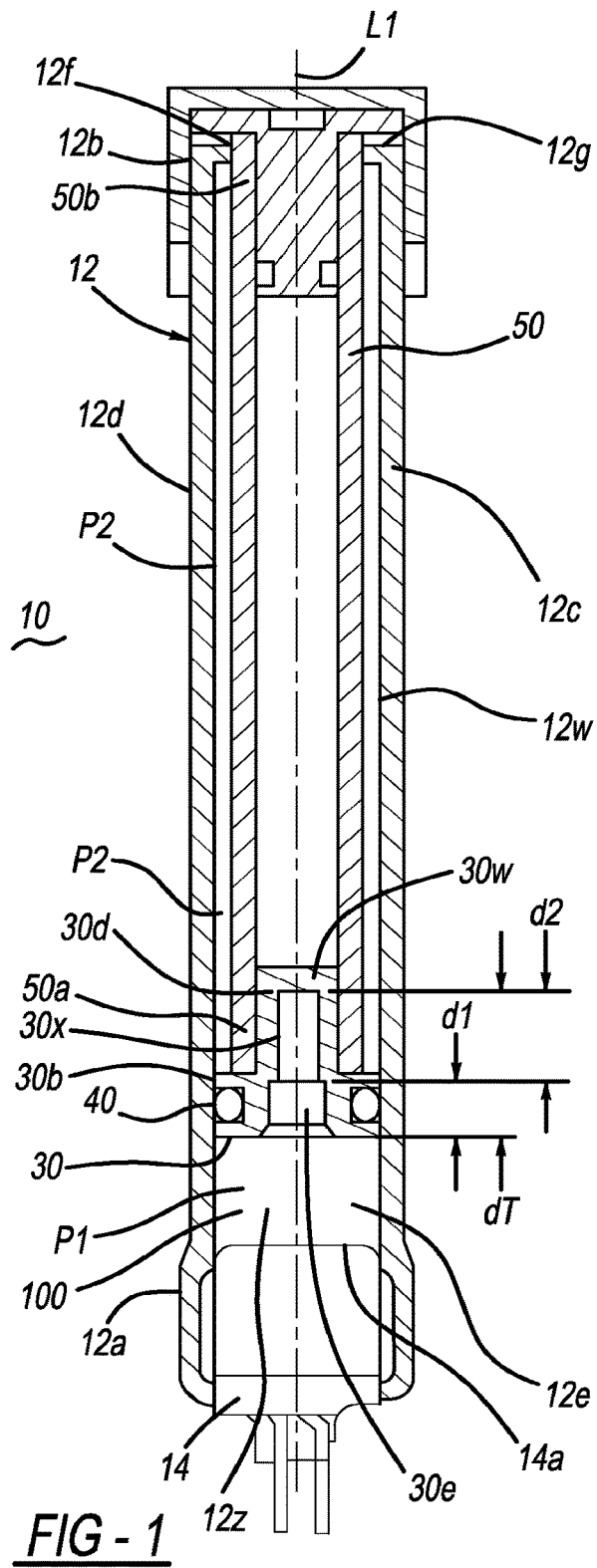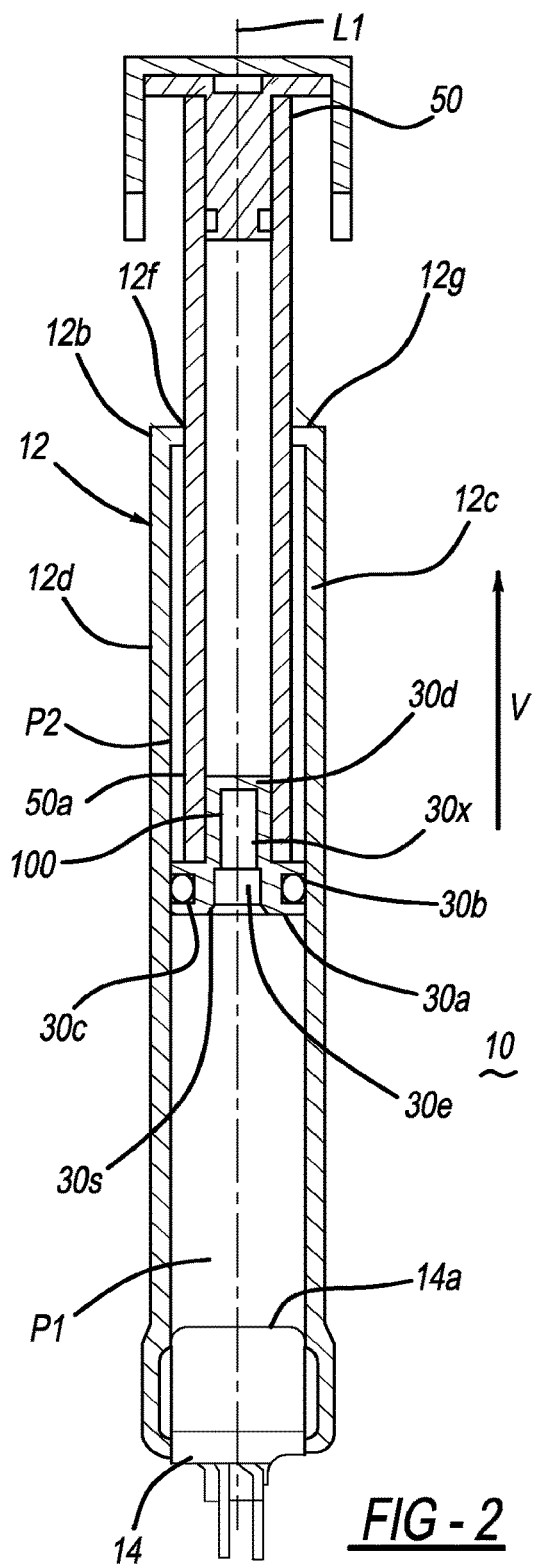

MULTI-PURPOSE AND TUNABLE PRESSURE CHAMBER FOR PYROTECHNIC ACTUATOR

CROSS-REFERENCE TO RELATED APPLICATIONS

This application claims the benefit of U.S. Provisional Application Ser. No. 61/990,157, filed on May 8, 2014, the disclosure of which is incorporated herein by reference in its entirety.

BACKGROUND OF THE INVENTION

The embodiments described herein relate to linear actuators and, more particularly, to actuators incorporating a piston driven by a pressurized fluid.

In pressurized gas-powered actuators, to meet different actuator force requirements necessary for different applications, it is frequently necessary to produce or stock a variety or selection of different actuators, each designed to meet a particular force requirement. Alternatively, in actuators powered by pressurized gas from a gas generator, it is frequently necessary to change the gas generator in a given actuator to obtain a gas generator tailored to provide the pressure necessary to generate the actuator forces needed for a given application. Both of these alternatives are uneconomical. Therefore, an ongoing problem exists with regard to economically providing a single actuator capable of producing an actuation force needed to meet any of a variety of different requirements.

SUMMARY OF THE INVENTION

In one aspect of the embodiments described herein, a pressurized gas-powered actuator is provided. The actuator includes a housing and a piston movably positioned within the housing. The piston has a drive pocket formed therein. A gas generator is positioned exterior of the piston and in fluid communication with the drive pocket.

In another aspect of the embodiments of the described herein, a pressurized gas-powered actuator is provided. The actuator includes a housing and a piston rod movably positioned within the housing. An expansion cavity extends into the piston rod. A gas generator is positioned exterior of the piston rod and in fluid communication with the expansion cavity.

BRIEF DESCRIPTION OF THE DRAWINGS

FIG. 1 shows a cross-sectional side view of pressurized gas-powered actuator in a condition prior to activation.

FIG. 2 shows a cross-sectional side view of the actuator of FIG. 1 at a first point in time after activation.

DETAILED DESCRIPTION

Figure 3:
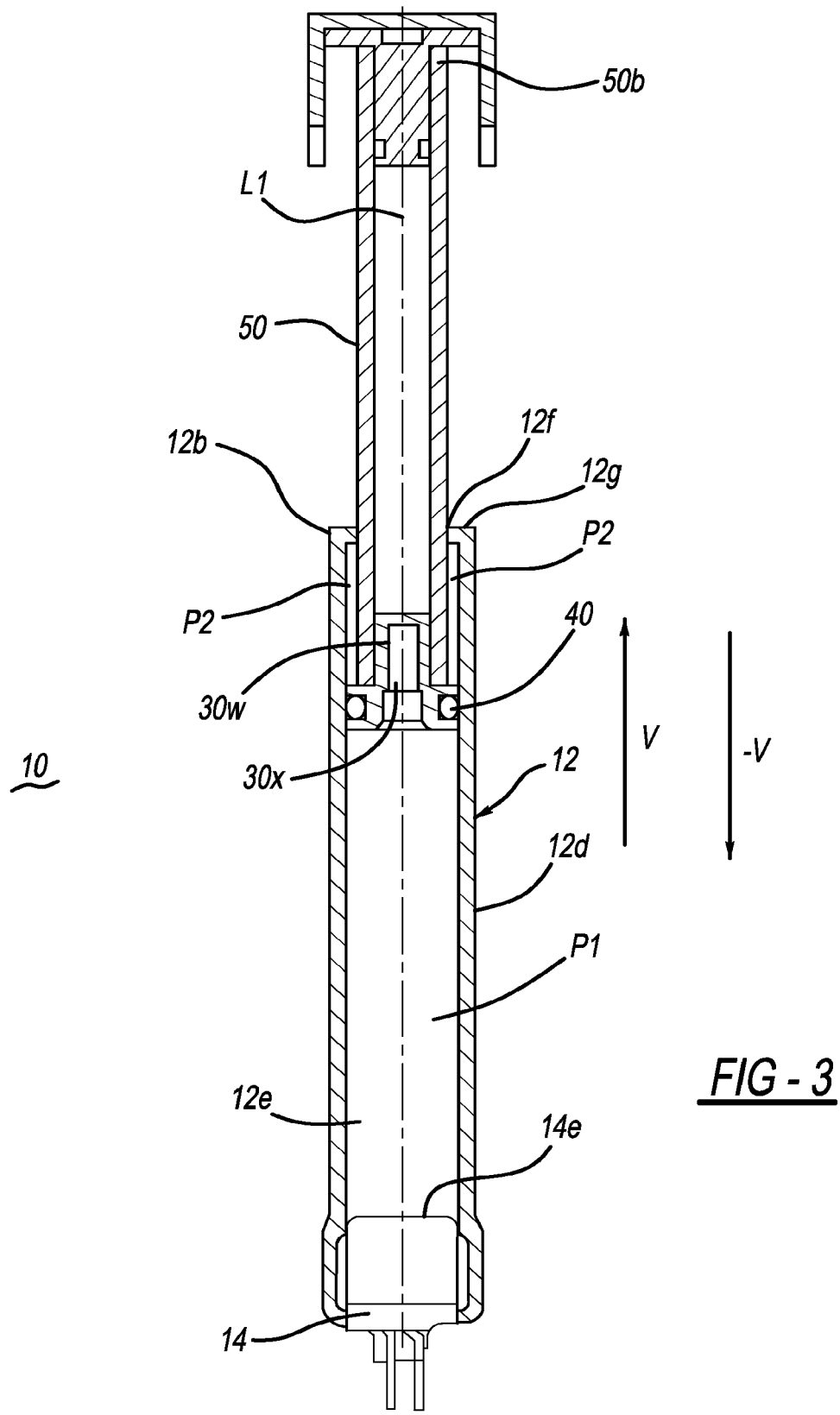
FIG. 3 shows a cross-sectional side view of the actuator of FIG. 1 after activation, at second point in time later than the first point in time.

Unless otherwise specified, like reference numerals refer to like parts throughout the description of several views of the drawings. In addition, while target values are recited for the dimensions of the various features described herein, it is understood that these values may vary slightly due to such factors as manufacturing tolerances, and also that such variations are within the contemplated scope of the embodiments described herein.

FIGS. 1-3 show cross-sectional side views of a pressurized gas-powered actuator in a condition prior to activation (FIG. 1) and in various stages after activation (FIGS. 2 and 3). The actuator 10 may be mounted to any suitable device or mechanism, and may be operatively coupled (via piston rod 50, described in greater detail below) to the device or mechanism for transmitting a force to the device or mechanism. The actuation force is generated responsive to the introduction of a pressurized gas into a housing of the actuator, in a manner described below. The pressurized gas may be generated within the housing (for example, by a gas generator incorporated into the housing), or the gas may be introduced into the housing from an external gas source in fluid communication with the housing interior. One possible application for an actuator as described herein is in lifting a portion of a hood of an automotive vehicle.

In the embodiment shown in FIGS. 1-3, actuator 10 has a housing 12, a piston 30 slidably positioned within the housing, and a piston rod 50 attached to the piston so as to move in conjunction with the piston. Housing 12 has an outermost housing wall 12d defining a first end 12a, a second end 12b, a longitudinal central axis L1 of the housing 12, and a body 12c connecting the first and second ends. Wall 12d also defines a hollow interior 12e of the housing. In the embodiment shown in FIGS. 1-3, housing first end 12a is flared radially outwardly to accommodate a suitable gas generator 14 (for example, a known micro-gas generator) to be inserted and retained therein by crimping, adhesive attachment, or any other suitable method. Alternatively, the gas generator 14 may be attached to housing first end using any suitable retention method. A gas-emitting portion 14a of the gas generator 14 is positioned within the housing so that generated gases flow into the housing interior after activation of the gas generator. If desired, a suitable seal (such as an epoxy seal, o-ring seal or other sealing means; not shown) may be provided to prevent or minimize leakage of generated gas between the gas generator 14 and the housing 12 an exterior of the housing. In embodiments described herein, the gas generator 14 is positioned exterior of the piston or the piston/piston rod combination (i.e., no portion of the gas generator 14 resides within the piston (for example, within a cavity formed in the piston)). In addition, in embodiments described herein, the piston or the piston/piston rod combination is spaced apart from the gas generator 14.

In the embodiment shown in FIGS. 1-3, housing second end 12b has an opening 12f structured to receive therethrough piston rod 50 attached to piston 30, which is slidably positioned in the housing interior. Opening 12f may be sized or otherwise structured to laterally constrain or support to the piston rod 50 as portions of the rod move into and out of the housing through opening 12f. In the particular embodiment shown in FIGS. 1-3, a an end wall 12g is formed from a portion of housing 12, and opening 12f is drilled or otherwise formed in the wall 12g.

Piston 30 has a base 30a with an outer wall 30b. A groove 30c is formed in wall 30b and is structured for receiving therein an O-ring 40 or another suitable resilient gas-tight seal. In a known manner, O-ring 40 resiliently slidingly contacts the interior surfaces of housing wall 12d, thereby providing a substantially gas-tight seal between the piston 30 and wall 12d. When piston 30 is positioned in housing 12 with O-ring 40 contacting the housing wall interior surfaces, the region of contact between the O-ring and the housing wall defines a boundary between a relatively higher pressure side P1 of the piston and a relatively lower pressure side P2 of the piston.

In the embodiment shown in FIGS. 1-3, a projection 30d extends from base 30a. Projection 30d is structured for engaging (or for suitable attachment to) an associated piston rod 50 in an interference fit, or for otherwise enabling or facilitating attachment of the piston rod 50 to the piston 30.

Figure 5:
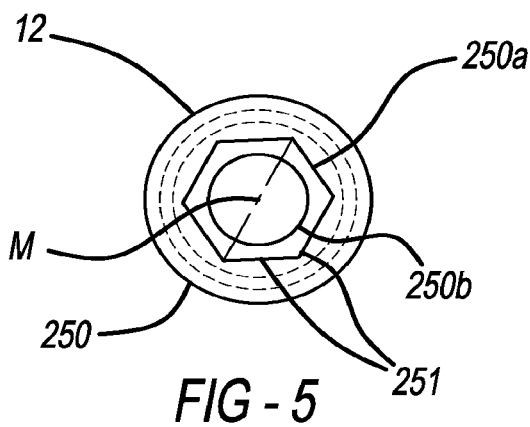
FIG. 5 is an end view of a piston/piston rod combination in accordance with an embodiment described herein, showing a configuration of a drive pocket formed in an end of the piston.

In the embodiment shown in FIGS. 1-3, a drive pocket 30e is formed in piston base 30a. Drive pocket 30e provides a receptacle into which a drive tool may be inserted, for use in assembling the actuator. Drive pocket 30e has a depth d1 measured from a surface 30s of the piston closest to the gas generator 14, along an axis parallel to central axis L1. In a particular embodiment, walls defining drive pocket 30e are arranged in a hexagonal configuration (for example, as shown in FIG. 5) so as to engage a complementary hex-shaped drive tool inserted into the cavity for use in assembling the actuator.

Figure 4:
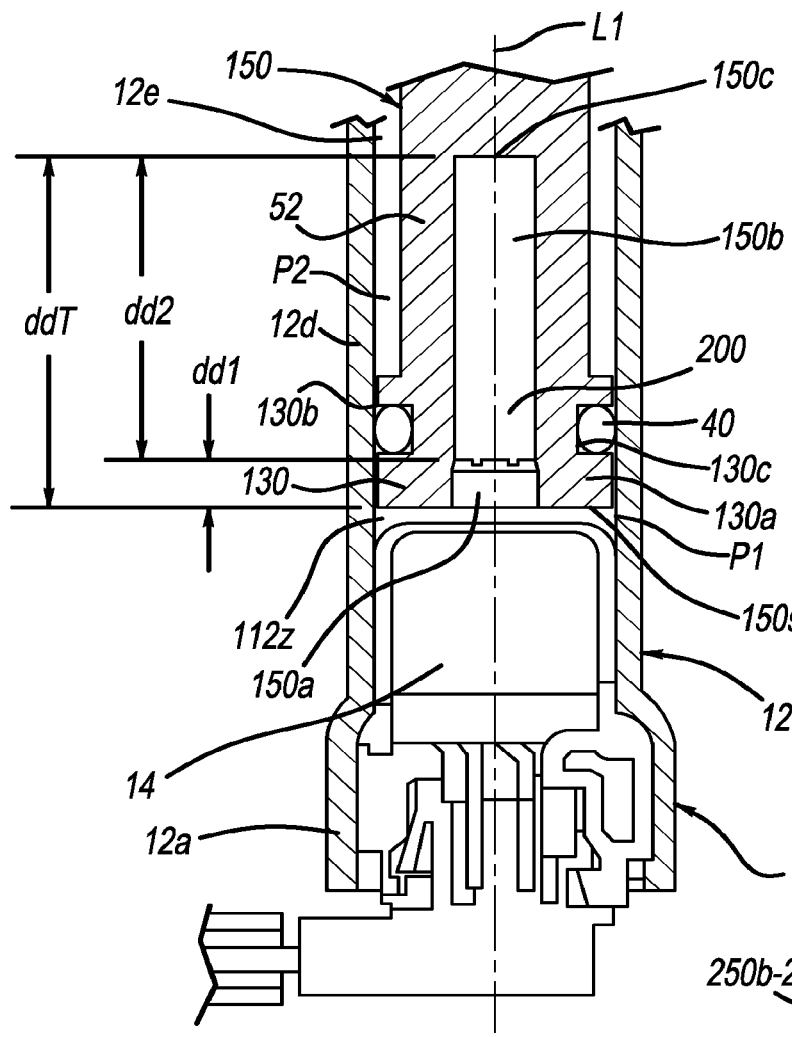
FIG. 4 is a partial cross-sectional view of an actuator and associated piston and piston rod in accordance with another embodiment described herein.
Figure 6:
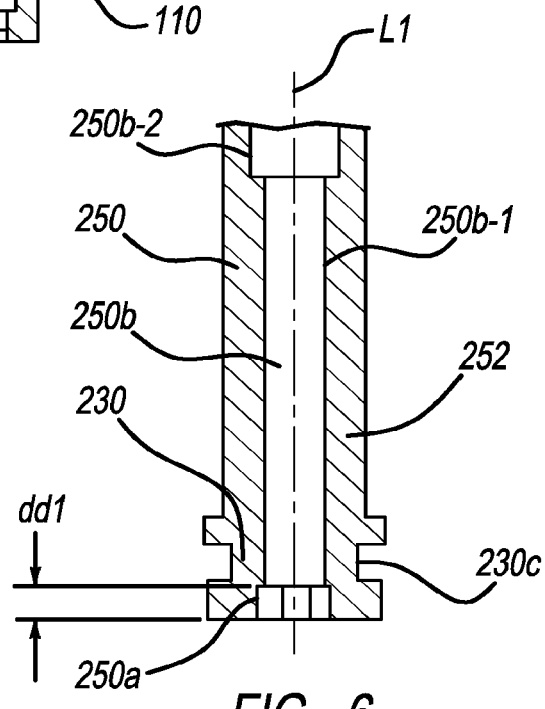
FIG. 6 is a partial cross-sectional view of the piston/piston rod combination of FIG. 5.
Figure 7:
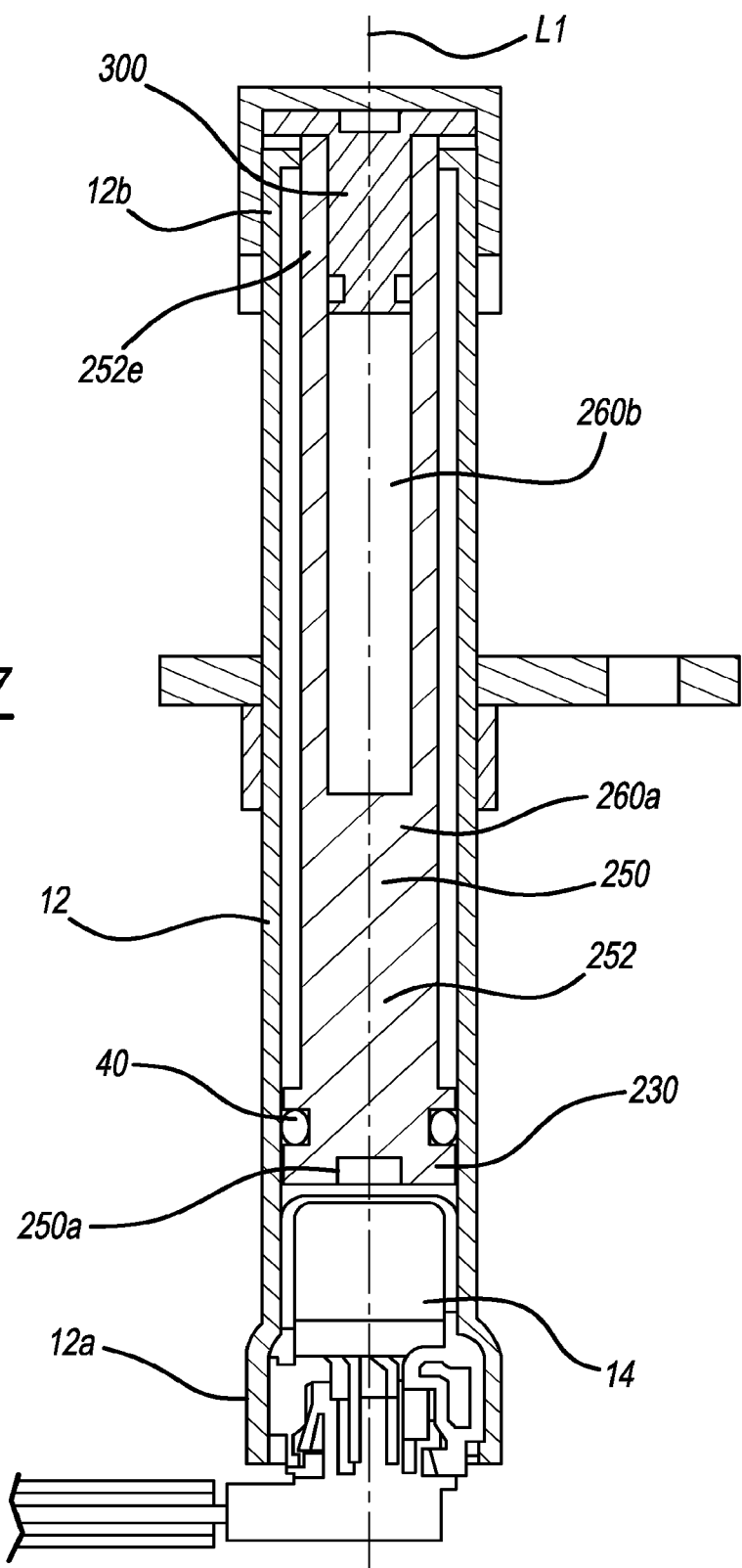
FIG. 7 is a cross-sectional side view of a pressurized gas-powered actuator in accordance with another embodiment described, in a condition prior to activation.

In particular embodiments, the ape formed by the walls defining the drive pocket 30e, 250a in a given drive pock or drive pocket/expansion cavity configuration is structured to correspond to (and/or to be unique to) that particular drive pocket or drive pocket/expansion cavity configuration. For example, a piston/piston rod combination having an expansion cavity structured as shown in FIG. 4 may have a first shape (for example, hexagonal) formed by the walls defining the drive pocket, while a piston/piston rod combination having an expansion cavity structured as shown in FIG. 6 may have a second shape (for example, square) formed by the walls defining the drive pocket, where the second shape is different from the first shape. In addition, a piston/piston rod combination having an expansion cavity structured as shown in FIG. 7 may have a third shape (for example, octagonal) formed by the walls defining the drive pocket, where the third shape is different from the first and second shapes. This enables the drive pocket or drive pocket/expansion cavity configuration to be identified using only the drive pocket outer boundary shape.

In the embodiments described herein, the dimensions (including depth d1) of the drive pocket and the shape defined by the pocket outer walls are determined by such factors as the need to provide engagement with a complementarily-shaped drive tool sufficient to facilitate assembly of the actuator, the desired wall thickness of the piston in adjacent the drive pocket, and other pertinent factors. If desired or required, these drive pocket dimensions may be standardized or made constant for a variety of piston sizes and configurations, thereby enabling a single drive tool to be used to assemble any of a variety of similar actuator embodiments. The drive pocket functional and/or space requirements may limit the degree (if any) to which the drive pocket dimensions may be varied in accordance with other design considerations. However, where feasible, the drive pocket configuration and dimensions may be varied so as to vary the volume of the various void spaces (such as void space 100 as described herein), and so as to correspondingly vary the response or performance characteristics of the actuator.

In the embodiment shown in FIGS. 1-3, an adjustable or tunable expansion cavity 30x is formed in piston 30 extends a distance d2 from an end of the drive pocket 30e, and along an axis parallel to central axis L1. In the embodiments described herein, the expansion cavity extends from an end of the drive pocket located opposite the end that is positioned proximate or in fluid communication with the gas generator 14. The expansion cavity is separate from the drive pocket 30e and is in fluid communication with the drive pocket. In the embodiment shown in FIGS. 1-3, expansion cavity 30x is a blind hole concentric with drive pocket 30e and ending at a wall 30w formed proximate the end of projection 30d. Cavity 30x and wall 30w may be defined by, for example, drilling a blind hole in direction V into the end of the piston 30. Thus, the expansion cavity 30x extends to a total depth dT of d1+d2 from the piston surface 30s.

In the embodiment shown in FIGS. 1-3, expansion cavity 30x is longitudinally cylindrical in shape and has a constant radius. However, an expansion cavity as described herein may have any cross-sectional and/or longitudinal shape usable for a particular application. Also, although the expansion cavity embodiments described herein are concentric with an associated drive pocket or with an associated piston rod or piston/piston rod combination, an expansion cavity may be provided which is not concentric with one or more of these features.

In any of the embodiments described herein, the diameter or other maximum outer dimension(s) of the expansion cavity may be either the same as, larger, or smaller than the largest outermost dimension(s) of the drive pocket to which it is adjacent. In the particular embodiment shown in FIGS. 1-3, the diameter of expansion cavity 30x is smaller than the largest outermost dimension of the drive pocket. This condition is also shown in FIG. 5, where it is seen, for example, that the diameter of the expansion cavity 250b is less than the largest outermost dimension of the drive pocket (i.e., the distance M between diametrically opposite corners defined by intersecting flats of a hexagonal drive pocket).

In the embodiments described herein, the drive pocket, the expansion cavity and the portions of the housing interior surrounding the gas generator and located between the gas generator 14 and the piston prior to activation of the gas generator also combine to define a chamber or void space structured for accommodating therein expansion of gas generator combustion products resulting from activation of gas generator 14. For example, in the particular embodiment shown in FIGS. 1-3, drive pocket 30e, expansion cavity 30x and the portions 12z of the housing interior surrounding the gas generator and located between gas generator 14 and the piston 30 prior to activation of the gas generator also combine to define a chamber or void space (generally designated 100) structured for accommodating therein expansion of gas generator combustion products resulting from activation of gas generator 14. Expansion cavity 30x also acts to restrict and channel the expansion of the generated gases. Gases expanding into cavity 30x push against wall 30w to force movement of the piston in direction V (FIG. 2).

In the embodiments described herein, while the shape and dimensions of the drive pocket may be constrained by the need to engage a suitable drive tool, the shape and/or dimensions of the expansion cavity are controllable independently of the drive pocket dimensions, and may be specified so as to adjust the volume of the void space or to provide a desired void space volume necessary to correspondingly adjust the actuator response characteristics, in the manner described herein. For example, In the embodiment shown in FIGS. 1-3, while the shape and dimensions of the drive pocket 30e may be constrained by the need to engage a suitable drive tool, the shape and/or dimensions of the expansion cavity 30x are controllable independently of the drive pocket dimensions, and may be specified so as to adjust the volume of void space 100 or to provide a desired void space volume necessary to correspondingly adjust the actuator response characteristics, in the manner described herein. More specifically, by controlling the volume of the expansion cavity independently of (and without the need to vary) other design parameters such the spacing between the piston and the gas generator 14, the known amount that the void space will increase due to movement of the piston along its stroke length, the output of the gas generator, and/or the overall length of the piston and/or piston rod or the actuator, the pressure acting on the piston or piston/piston rod combination (and thus, the resulting force exerted by the actuator) may be correspondingly controlled. For example, if the volume of the expansion cavity is relatively smaller, the space available for expansion of the generated gases will be relatively less, and the pressure acting on the piston will be relatively greater. Conversely, if the volume of the expansion cavity is relatively greater, the space available for expansion of the generated gases will be relatively greater, and the pressure acting on the piston will be relatively lower. Also, the ability of the actuator force or response to be tuned or adjusted by varying the volume of the expansion cavity and/or drive pocket enables the response to be controlled without the necessity of varying the gas generator output. Therefore, a wide range of actuator responses may be provided using a gas generator with single gas output.

During fabrication of piston 30, the depth d2 of expansion cavity 30x may be adjusted to any of a variety of desired values, to correspondingly increase or decrease the volume of the expansion cavity 30x and thus the total volume of the void space 100 prior to activation of the actuator. The depth d2 may be limited by such factors as the total length of the piston, the dimension of depth d1, and the desired wall thickness of the piston at the end of projection 30d. Thus, the total pre-activation volume of void space 100 available to accommodate expansion of the combustion products may be controlled by independently controlling the overall dimensions (including depth d2) of the expansion cavity 30x.

The void chamber volume necessary to provide a desired piston actuation pressure range for a given gas generator output may be determined analytically and/or iteratively by experimentation, using known methods.

In a particular embodiment, the minimum thickness of piston outer wall 30b is 2 millimeters.

In a particular embodiment, the minimum thickness of piston wall 30w is 1 millimeter.

Piston rod 50 is the mechanism through which the actuator force is transmitted to an element (for example, a portion of a hood of a vehicle (not shown)) aligned with the piston rod. Piston rod 50 has a first end 50a attached to the piston so as to move in conjunction with the piston. A second end 50b opposite the first end may be configured for attachment to (or to facilitate contact with) an element or mechanism to which the actuator force is to be transmitted. In the embodiment shown in FIGS. 1-3, piston rod 50 is hollow. Alternatively, the piston rod (or a portion of the length thereof) may be solid as shown in FIGS. 4 and 7. The piston rod may also have any particular length, diameter, shape and/or other characteristic(s) suitable or necessary for a particular application.

In the embodiments described herein, the piston rod may be formed from a metallic material, a polymeric material or any other suitable material or materials.

In particular embodiments, the piston rod is formed from a hollow shell or tube. The shell may be formed from a metallic material or any other suitable material. The various portions of any expansion cavity are then formed inside the interior of the shell by injecting a suitable flow/able filler material (a polymer, for example) into the shell interior (for example, through openings formed in the shell walls) when the shell is positioned in a suitable mold or fixture, and after cores or inserts (not shown) defining the desired expansion cavity are positioned within the shell interior. After injection of the filler material, the cores are removed, leaving the expansion cavity. This procedure enables a greater degree of control over the volume of the expansion cavity.

Figure 9A:
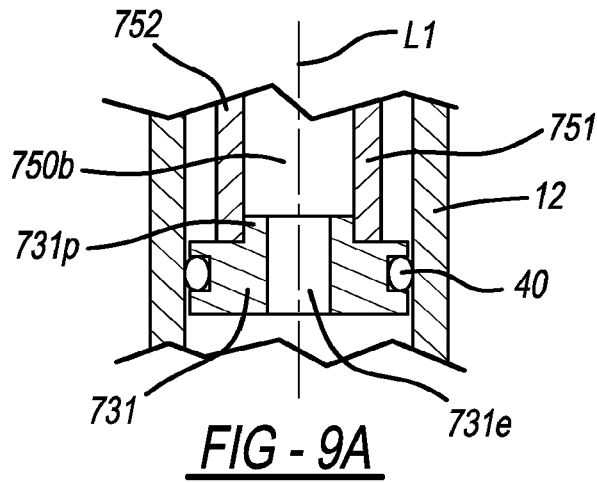
FIG. 9A is a schematic cross-sectional side view of a portion of a piston/piston rod combination in accordance with another embodiment described herein, positioned within an actuator housing.
Figure 9B:
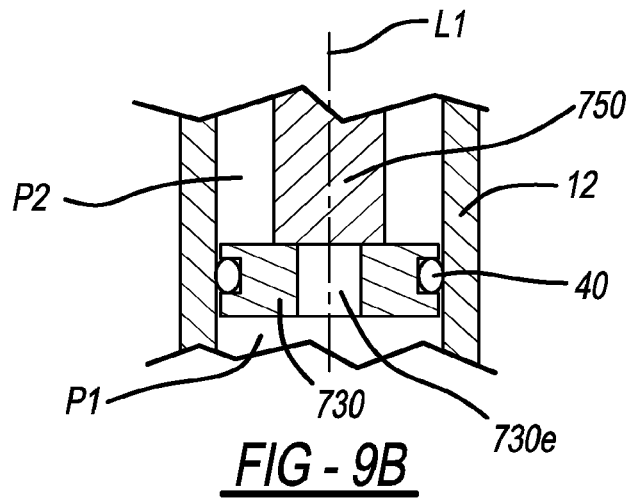
FIG. 9B is a schematic cross-sectional side view of a portion of a piston/piston rod combination in accordance with another embodiment described herein, positioned within an actuator housing.
Figure 9C:
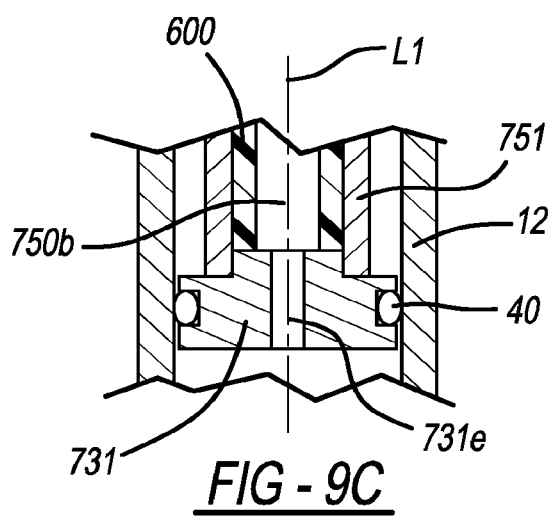
FIG. 9C is a schematic cross-sectional side view of a portion of a piston/piston rod combination in accordance with another embodiment described herein, positioned within an actuator housing.
Figure 11:
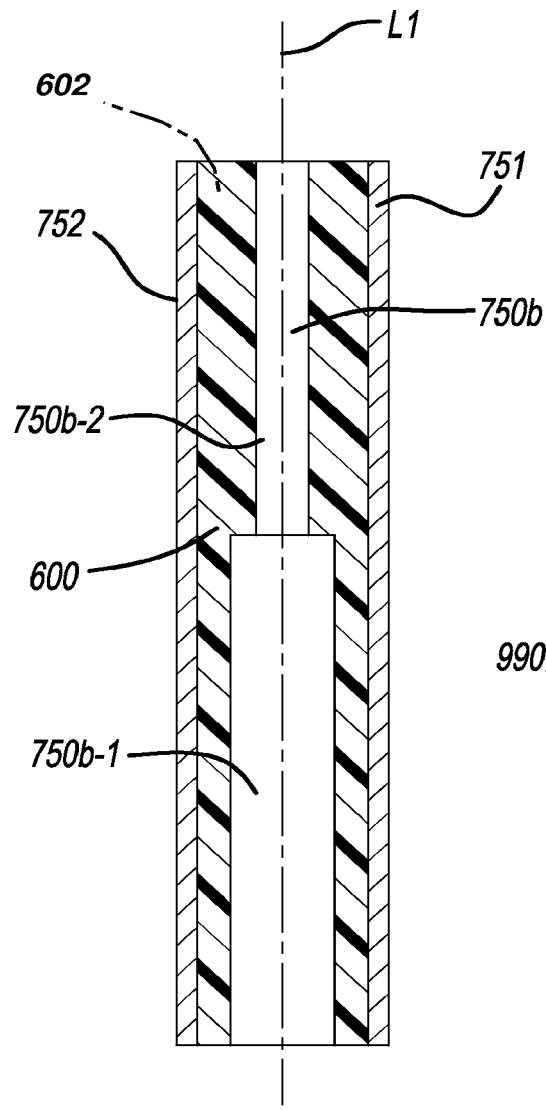
FIG. 11 is a schematic cross-sectional side view of a piston rod in accordance with another embodiment described herein.

For example, as shown in FIGS. 11, 9A and 9C, the piston rod 751 includes a hollow shell or tube 752. Shell 752 may be formed from a metallic material or any other suitable material. The various portions of the expansion cavity 750b (for example, portions 750b-1 and 750b-2 as shown in FIG. 11) are then formed inside the interior of shell 752 by injecting a suitable flowable filler material 600 (a polymer for example) into the shell interior after cores or inserts (not shown) forming an annular plenum(s) 602 and defining (after their removal) the desired expansion cavity are positioned within the shell interior. After injection of the filler material 600 to fill the plenums), the cores are removed, leaving an annular sleeve inside the tube, the sleeve including a chamber forming the expansion cavity 750*b*. This procedure enables a greater degree of control over the volume of the expansion cavity.

The flowable filler material may comprise, for example, a polymeric melt, an uncured and curable polymeric material, or any other suitable material. One example of a suitable material is an ABS material, which is a known copolymer of Acrylonitrile, Butadiene, and Styrene ABS material may be obtained from any of a variety of known sources, for example, from Premier Plastic Resins, Inc. of Lake Orion, Mich. Properties of these materials are discussed at, for example, http://www.absmaterial.com/. Other suitable materials are various formulations or grades of liquid crystal polymer (LCP) materials, which may be obtained, for example, from RTP Company of Winona, Minn. Properties of these materials are discussed at, for example, http://www.rtpcompany.com/contact/. The particular material used may be processed and cooled or cured per manufacturer or distributor recommendations.

In another aspect of the embodiments shown in FIGS. 11, 9A and 9C, a product may be made by a method of forming an actuator, the method comprising the steps of: providing a hollow tube; inserting at least one core within the tube so as to define an annular plenum between the tube and the core; positioning a filler material within the annular plenum, thereby forming an annular sleeve formed from the filler material and defining a chamber therein; and removing the core from the chamber.

After filling the tube with the filler material, a drive pocket may be positioned in fluid communication with the chamber forming the expansion cavity. The drive pocket may be formed, for example, in a drive pocket attachment attachable to the tube or to the filler material.

The step of positioning the filler material may include the steps of: providing a filler material comprising a polymeric melt; inserting the polymeric melt within the annular plenum; and cooling the polymeric melt to form a polymeric sleeve to define the chamber within the polymeric sleeve.

Alternatively, the step of positioning the filler material may include the steps of: providing a filler material comprising an uncured polymeric material; inserting the uncured polymeric material within the annular plenum; and curing the polymeric material to form a polymeric sleeve to define the chamber within the polymeric sleeve.

The method may include additional steps of: providing an actuator housing; positioning the piston rod within the housing; and securing a gas generator within the housing so as to form a gas-tight seal between the gas generator and the housing, and such that the gas generator is in fluid communication with the chamber.

In the embodiments described herein, the values of certain design parameters, such as the size of the gas generator, the spacing between the piston and the gas generator 14 and the overall length of the piston 30 or the actuator 10 may be determined or constrained by such factors as desired piston rod stroke length, allowable envelope size for the actuator, and other pertinent factors. These factors may limit the degree (if any) to which the spacing between the piston and the gas generator and the overall length of the piston/piston rod or the actuator may be varied. However, where feasible, the spacing between the piston and the gas generator may be varied so as to vary the volume of the various void spaces (such as void space 100 as described herein), and so as to correspondingly vary the response or performance characteristics of the actuator previously described.

Referring to FIG. 4, in particular embodiments (such as embodiment 110 and also in the embodiments shown in FIGS. 6, 6A and 7) of the actuator and piston, a piston 130 and a piston rod 52 as previously described are formed as a single part, into a piston/piston rod combination 150. Piston/piston rod 150 has drive pocket 150*a* and an expansion cavity 150*b* extending from an end of the drive cavity and terminating in a wall 150*c*, in a manner similar to drive pocket 30*e*, expansion cavity 30*x* and wall 30*w* in the previously described embodiment. The expansion cavity extends from an end of the drive pocket located opposite the end that is positioned proximate the gas generator 14. Wall 150*c* may be defined by, for example, drilling a blind hole in direction V into the end of the piston 150. Gases expanding into expansion cavity 150*b* push against wall 150*c* to force movement of the piston 150 in direction V (FIG. 2).

Piston/piston rod 150 is slidably positioned within housing interior 12*e*. Piston 130 has a base 130*a* with an outer wall 130*b*. A groove 130*c* is formed in wall 130*b* and is structured for receiving therein an O-ring 40 or another suitable resilient gas-tight seal. In a known manner, O-ring 40 resiliently slidingly contacts the interior surfaces of housing wall 12*d*, thereby providing a substantially gas-tight seal between the piston 130 and wall 12*d*. When piston 130 is positioned in housing 12 with O-ring 40 contacting the housing wall interior surfaces, the region of contact between the O-ring and the housing wall defines a boundary between a higher pressure side P1 of the piston and a lower pressure side P2 of the piston, as previously described.

Drive pocket 150*a* has a depth dd1 measured from an end surface 150*s* of piston/piston rod 150 closest to gas generator 14, along an axis parallel to central axis L1. Expansion cavity 150*b* has a depth dd2 measured from an end of drive pocket 150*a*, also along an axis parallel to central axis L1. Expansion cavity 150*b* also extends to a total depth of dd1+dd2=ddT from end surface 150*s*.

Drive pocket 150*a*, expansion cavity 150*b* and the portions 112*z* of the housing interior surrounding the gas generator and located between gas generator 14 and the piston 30 also combine to define a chamber or void space (generally designated 200) which receives therein expansion of gas generator combustion products resulting from activation of gas generator 14. Expansion cavity 150*b* also acts to restrict and channel the expansion of the generated gases. Gases expanding into cavity 150*b* push against wall 150*c* to force movement of the piston in direction V (FIG. 2).

As noted with regard to the previously described embodiment, during fabrication of piston/piston rod 150, the dimensions (including depth dd2) of expansion cavity 150*b* may be adjusted independently of other design parameters affecting void space volume. The expansion cavity dimensions may be varied to any of a variety of desired values, to correspondingly increase or decrease the volume of the expansion cavity 150*b* and thus the total volume of the void space 200 prior to activation of the actuator. The depth dd2 may be limited by such factors as the total length of the piston and the dimension of depth dd1, for example.

Thus, as previously described, the total pre-activation volume of void space 200 of FIG. 4 available to accommodate expansion of the combustion products (and thus, the pressure acting on the piston) may be controlled by controlling the overall dimensions (including depth dd2) of the expansion cavity 150*b* independently of other parameters affecting the void space volume. Also, where feasible, and as previously described, other constituents of the void space (such as the overall dimensions (including depth dd1) of the drive pocket 150*a* and/or the initial spacing between the piston/piston rod 150 and the gas generator 14 may be varied to aid in adjusting the total volume of the gas-receiving void space.

In a particular embodiment, the minimum wall thickness of piston/piston rod 150 enclosing either drive pocket 150a or expansion cavity 150b is 2 millimeters.

Figure 6A:
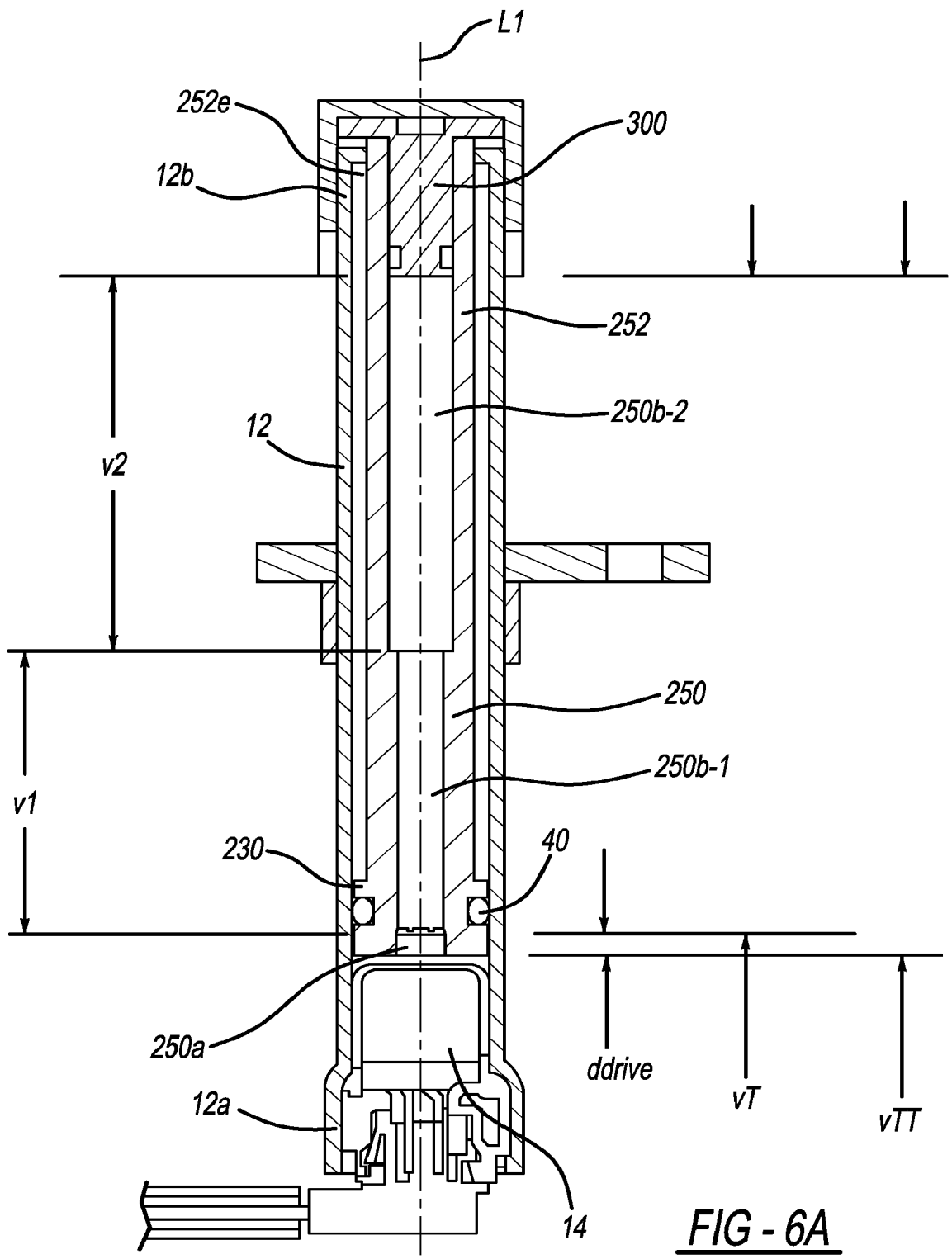
FIG. 6A is a cross-sectional side view of a pressurized gas-powered actuator in accordance with another embodiment described, in a condition prior to activation.

Referring to FIGS. 5, 6, and 6A, in a particular embodiment and as previously described, a piston 230 and a piston rod 252 as previously described are formed as a single part, into a piston/piston rod combination 250. Piston/piston rod 250 has drive pocket 250a having walls 251 and a depth dd1 and an expansion cavity 250b extending from an end of the drive pocket. The expansion cavity 250b extends from an end of the drive pocket located opposite the drive pocket end that is positioned proximate the gas generator 14. In this embodiment, the piston/piston rod 250 is hollow from the end of the drive pocket all the way to an end of the piston rod opposite the drive pocket end. The expansion cavity 250b extends from the end of the drive pocket along the length of the piston rod 252, to proximate an end 252c of the piston rod located opposite the end joined to the piston 230. A plug or cap 300 is secured in piston rod end 252c so as to form a substantially gas tight seal between the plug and the piston rod, thereby trapping expanding gases generated by activation of the gas generator and defining a boundary of the expansion cavity. Gases expanding into expansion cavity 250b push against plug 300 to force movement of the piston/piston rod 250 in direction V (FIG. 2).

In the particular embodiment shown in FIGS. 6 and 6A, expansion cavity 250b is formed using a continuous cavity extending between the first and second ends of the piston rod. Expansion cavity 250b has a first portion 250b-1 and a second portion 250b-2 adjacent to and in fluid communication with portion 250b-1. The various expansion cavity portions may be formed by boring out portions of a piece of bar stock in a known manner, for example, or by any other suitable method. Cavity first portion 250b-1 extends a first distance v1 from an end of the drive pocket as previously described, toward the plugged end of the piston rod. With plug 300 secured in the piston rod, cavity second portion 250b-2 extends a second distance v2 from the end of cavity first portion 250b-1 to where the plug 300 forms a seal with the piston rod. Thus, the total length of the expansion cavity 250b is v1+v2=vT. The total length of the void space residing within the piston and the piston rod is then vT+$d_{drive}$ (the length of the drive pocket 250a)=vTT.

In the embodiment shown in FIGS. 6 and 6A, the diameter or outermost dimension(s) of either of expansion cavity portions 250b-1 and 250b-2 may be either larger or smaller than the diameter or outermost dimension(s) of the other of expansion cavity portions 250b-1 and 250b-2. In the particular embodiment shown in FIGS. 6 and 6A, the diameter of expansion cavity first portion 250b-1 is smaller than the diameter of expansion cavity second portion 250b-2. However, both the lengths and the diameters (or outermost dimensions) of the cavity portions 250b-1 and 250b-2 can be adjusted independently of other design parameters as previously described, so as to provide a total void space volume in accordance with the requirements of a particular application.

In another particular embodiment similar to the embodiment shown in FIGS. 6 and 6A, the expansion cavity is formed using a continuous cavity having a constant diameter or outermost dimension(s), extending from an end of the drive pocket all the way to the second end of the piston rod. In this embodiment, the piston/piston rod 250 is hollow from the end of the drive pocket all the way to an end of the piston rod opposite the drive pocket end.

In another particular embodiment similar to the embodiment shown in FIGS. 6 and 6A, at least one of the expansion cavity portions 250b-1 and 250b-2 is tapered along at least a portion of an axial length of the cavity portion. This configuration provides additional flexibility of control over the expansion cavity volume within a predetermined length of the expansion cavity portion. FIGS. 10A-10D show various configurations of a tapered expansion cavity portion. These embodiments are generally similar to the embodiments shown in FIGS. 4 and 6A, and otherwise described herein. Other configurations are also contemplated.

Figure 10A:
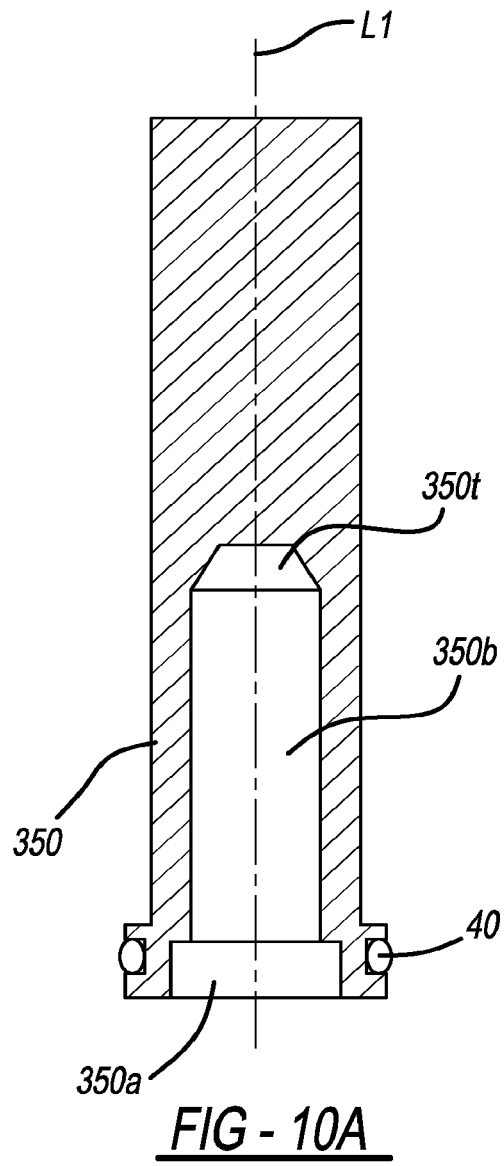
FIG. 10 is a schematic cross-sectional side view of a piston/piston rod combination in accordance with another embodiment described herein.
FIG. 10B is a schematic cross-sectional side view of a piston/piston rod combination in accordance with another embodiment described herein.
FIG. 10C is a schematic cross-sectional side view of a piston/piston rod combination in accordance with another embodiment described herein.
FIG. 10D is a schematic cross-sectional side view of a piston/piston rod combination in accordance with another embodiment described herein.

In FIG. 10A, the piston/piston rod combination 350 has a drive pocket 350a and expansion cavity 350b as previously described. The expansion cavity 350b also has a tapered portion 350t formed at an end thereof.

Figure 10B:
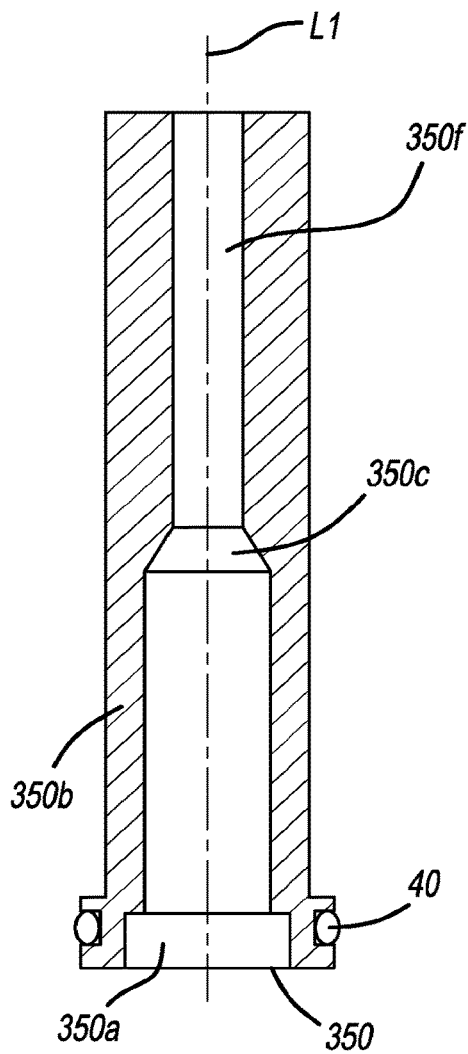

In the embodiment shown in FIG. 10B, which is similar to the embodiment shown in FIG. 10A, the piston/piston rod combination 350 has a drive pocket 350a and expansion cavity first portion 350b. The expansion cavity also has a tapered portion 350c formed at an end of expansion cavity portion 350b, and an additional expansion cavity portion 350f extending from the tapered portion 350c and continuing to an end of the piston rod.

Figure 10C:
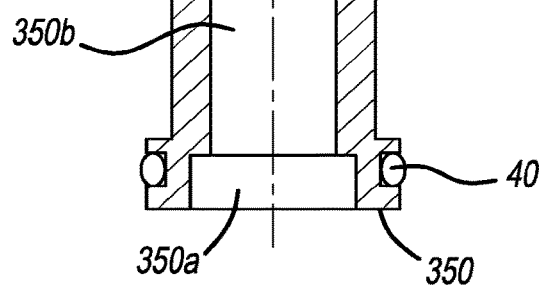

In the embodiment shown in FIG. 10C, the piston/piston rod combination 350 has a drive pocket 350a and expansion cavity first portion 350b. The expansion cavity also has a tapered portion 350c formed at an end of expansion cavity portion 350b, and an additional tapered portion 350t extending from tapered position 350c. An additional expansion cavity portion 350f extends from the second tapered portion 350t and continues to an end of the piston rod.

Figure 10D:
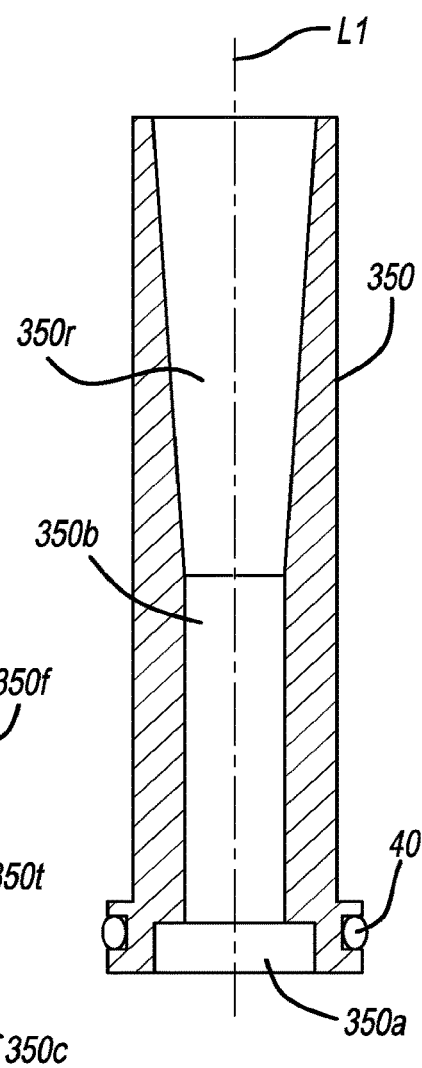

In the embodiment shown in FIG. 10D, the piston/piston rod combination 350 has a drive pocket 350a and expansion cavity first portion 350b. The expansion cavity also has a tapered portion 350r extending from the first portion 350b and continuing to an end of the piston rod.

Also, where feasible, and as previously described, other constituents of the void space (such as the overall dimensions (including depth dd1 of the drive pocket 250a) and/or the initial spacing between the piston/piston rod 250 and the gas generator 14 may be varied to aid in adjusting the total volume of the gas-receiving void space.

In the embodiment shown in FIG. 7, the piston/piston rod combination includes only a drive pocket 250a, and the separate expansion cavity is omitted. Piston rod 252 has a solid portion 260a adjacent the drive pocket 250a, and a hollow portion 260b (provided, for example, to reduce part weight) extending from an end of the hollow portion to an end of the piston rod an end 252e of the piston rod located opposite the end joined to the piston 230. In this embodiment, the volume of the drive pocket is adjusted to control the actuator response (i.e., the drive pocket alone functions as the expansion cavity). The ability to make small adjustments to the drive pocket volume where needed enables correspondingly small adjustments to be made to the actuator response, without the need to provide a hollow piston shaft.

In particular embodiments, the pocket is incorporated into a drive pocket attachment which is formed separately from the piston and the piston rod. The drive pocket attachment is attached to the piston or piston rod using welding, adhesive application, a threaded connection or any other suitable method.

For example, in the particular embodiment shown in FIG. 9B, drive pocket 730e is formed in a drive pocket attachment 730 which is formed separately from piston rod 750 and attached to the piston rod using welding, adhesive application, or any other suitable method. In this embodiment, drive pocket attachment 730 essentially functions as the piston, and the portion of the piston rod 750 to which the attachment 730 is secured is solid.

In the particular embodiment shown in FIG. 9A, drive pocket 731e is formed in a drive pocket attachment 731 which is formed separately from piston rod and attached to the piston rod using welding, adhesive application, or any other suitable method. In this embodiment, drive pocket attachment 731 essentially functions as the piston. Attachment 731 includes a projection 731p extending into a hollow portion 750b of the piston rod defining a portion of the expansion cavity, to aid in positioning and securing the attachment 731 to the piston rod.

In the particular embodiment shown in FIG. 9C, drive pocket 731c is formed in a drive pocket attachment 731 which is similar to that shown in FIG. 9A. In this embodiment, the portion 750b of the expansion cavity abutting the drive pocket is defined by a filler material 600 (as described elsewhere herein) introduced into a hollow portion of the piston rod 751 in a known manner (for example, through openings formed in walls of the shell).

Incorporating the drive cavity into a piece formed separately from the piston and piston rod enables the portion of the expansion cavity adjacent the drive pocket to be formed having a diameter or outermost dimension greater than the diameter of outermost dimension of the drive pocket.

Figure 12:
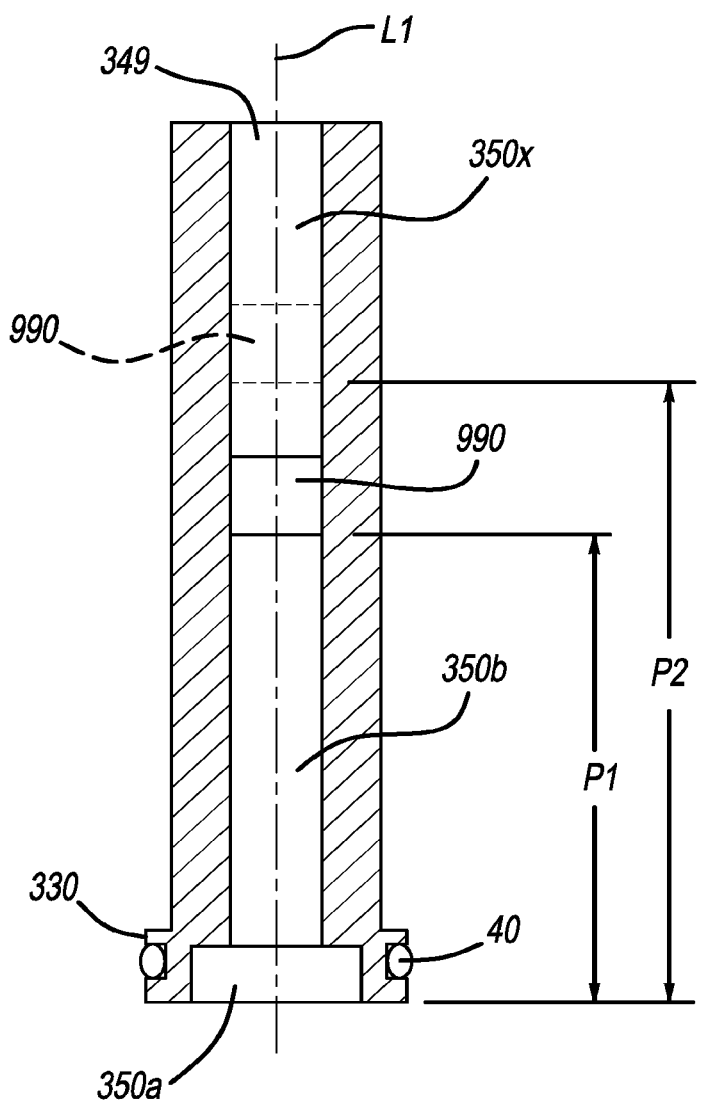
FIG. 12 is a schematic cross-sectional side view of a piston/piston rod combination in accordance with another embodiment described herein.

FIG. 12 is a schematic cross-sectional side view of a piston/piston rod combination in accordance with another embodiment described herein. In this embodiment, a bore or passage 349 extends through a length of the piston rod and/or through a portion of the piston 330. The expansion chamber 350b is formed by inserting and securing a plug 990 to a desired location along bore 349, so as to provide a corresponding desired volume of the expansion chamber. Plug 990 is configured and/or secured to the piston rod such that a substantially gas-tight seal is formed between the plug and the walls of the bore. The plug may form an interference fit with the bore walls, or the plug may be secured in position using any other suitable method. Plug 990 is shown in FIG. 12 inserted to a location p1 with respect to an end of the piston/piston rod combination, so as to define a limit of the expansion cavity and provide an expansion cavity having a first predetermined volume. However, if desired, the plug may alternatively be inserted into bore 349 to a position p2 so as to provide an expansion cavity having a first predetermined volume different from the first volume. Plug 990 may be formed from any suitable material. The ability to position the plug 990 at any desired position along the length of bore 349 provides a great degree of control over the expansion chamber volume.

Figure 8:
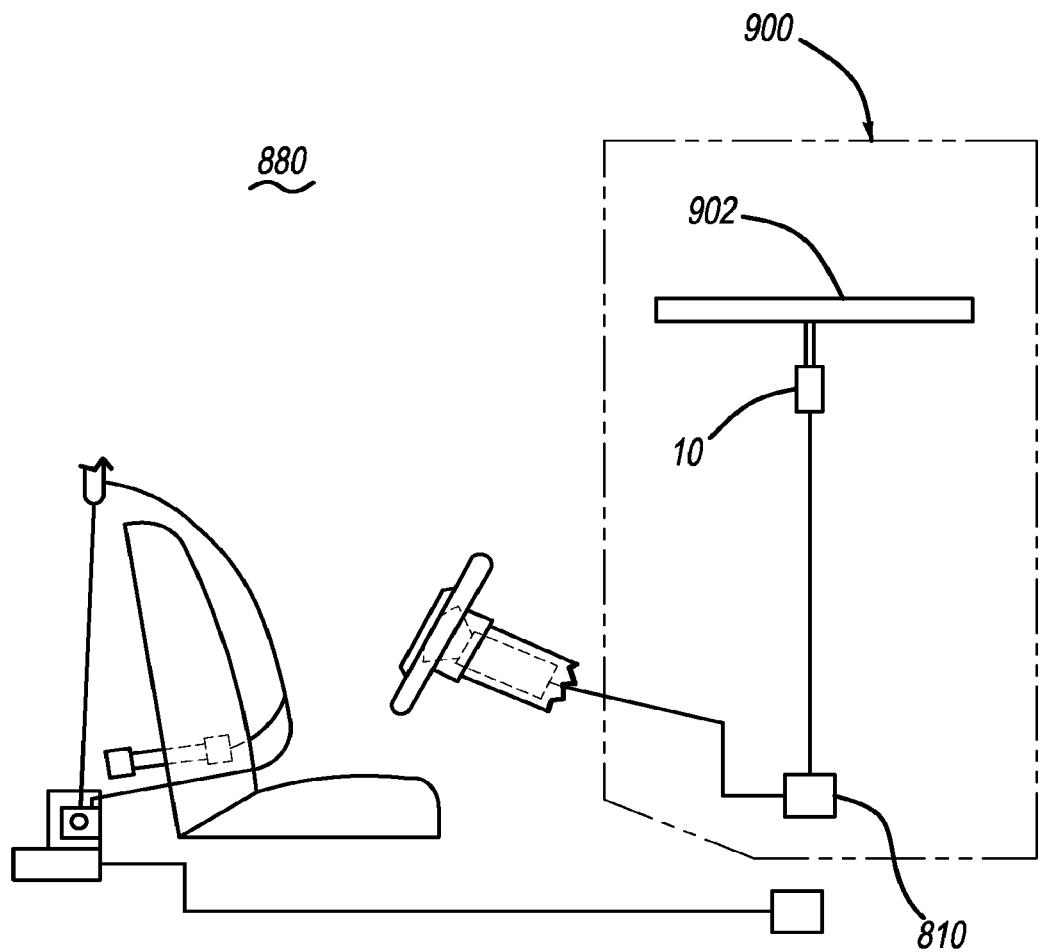
FIG. 8 is a schematic view of a portion of a pedestrian protection system installed in a vehicle and incorporating a hood-lifting device in accordance with an embodiment described herein.

FIG. 8 is a schematic view of a portion ref a pedestrian protection system 900 installed in a vehicle 880 and incorporating a hood-lifting device utilizing or comprising and actuator 10 including an adjustable expansion cavity in accordance with an embodiment described herein. In this embodiment of the pedestrian protection system 900, a vehicle mounted sensor 810 detects contact between the vehicle and a pedestrian (not shown). Responsive to this detected contact, an activation signal is sent to the hood-lifting mechanism 10, resulting in activation of the gas generator or otherwise releasing pressurized gases into the interior of housing 12 to produce extension of the piston rod 50 from the housing, as previously described. The extending piston rod 50 then raises a portion of a vehicle hood 902. The hood-lifter activation signal may be sent from the sensor 810 or from a suitably-configured controller (not shown) which receives the vehicle-pedestrian contact signal from sensor 810 and generates the activation signal in response thereto.

The embodiments of the invention thus described, it will be clear that the same may be varied in many ways. Such variations are not to be regarded as a departure from the spirit and scope of the invention, and all such modifications as would be understood by one skilled in the art are intended to be included within the scope of the following claims.

What is claimed is:

1. A method of forming an actuator, the method comprising the steps of:
   providing a hollow tube;
   inserting at least one core within the tube so as to define an annular plenum between the tube and the core;
   positioning a filler material within the annular plenum, thereby forming a sleeve of filler material defining a chamber therein; and
   removing the core from the chamber.

2. The method of claim 1 further comprises the step of providing a drive pocket fluidly communicating with said chamber at a first end of the tube.

3. The method of claim 1 wherein said positioning step comprises the steps of:
   providing a filler material comprising a polymeric melt;
   inserting the polymeric melt within the annular plenum; and
   cooling the polymeric melt to form a polymeric sleeve to define the chamber within the polymeric sleeve.

4. The method of claim 1 wherein said positioning step comprises the steps of:
   providing a filler material comprising an uncured polymeric material;
   inserting the uncured polymeric material within the annular plenum; and
   curing the polymeric material to form a polymeric sleeve to define the chamber within the polymeric sleeve.

5. The method of claim 1 further comprises the step of:
   providing an actuator housing;
   positioning the hollow tube and sleeve of filler material within the housing; and
   securing a gas generator within the housing so as to form a gas-tight seal between the gas generator and the housing, and such that the gas generator is in fluid communication with the chamber.

6. The method of claim 1 wherein the chamber extends from a first end of the housing to a second end of the housing opposite the first end.

7. The method of claim 6 wherein the chamber has a first portion with a first diameter and a second portion with a second diameter different from the first diameter.

8. The method of claim 6 wherein the chamber has a constant diameter along an entire length of the chamber.

9. The method of claim 1 wherein the at least one core comprises a first core having a first diameter and a second core having a second diameter, wherein the first diameter is larger than the second diameter.

10. The method of claim 2 wherein the drive pocket is incorporated into a drive pocket attachment formed as a part separate from the hollow tube or sleeve of filler material and attachable to the hollow tube or sleeve of filler material.

11. The method of claim 2 wherein the drive pocket is incorporated into a drive pocket attachment formed as a part separate from the chamber.

12. The method of claim 2 wherein a largest radially outermost dimension of the chamber is less than a largest radially outermost dimension of the drive pocket.

13. The method of claim 2 wherein a largest radially outermost dimension of the chamber is less than a largest radially outermost dimension of the drive pocket.

14. The method of claim 1 wherein the chamber is tapered along at least a portion of an axial length of the chamber.

15. The method of claim 5 further comprising a drive pocket interposed between the gas generator and the chamber.

16. The method of claim 1 wherein the hollow tube comprises a metal.

17. The method of claim 1 wherein said method further comprises the step of positioning a plug at a predetermined location within the sleeve of filler material so as to define a limit of an expansion cavity.

* * * * *